May 25, 1937.  R. L. SZWEDA  2,081,563
DIFFERENTIAL MECHANISM
Filed Sept. 12, 1936  2 Sheets—Sheet 1
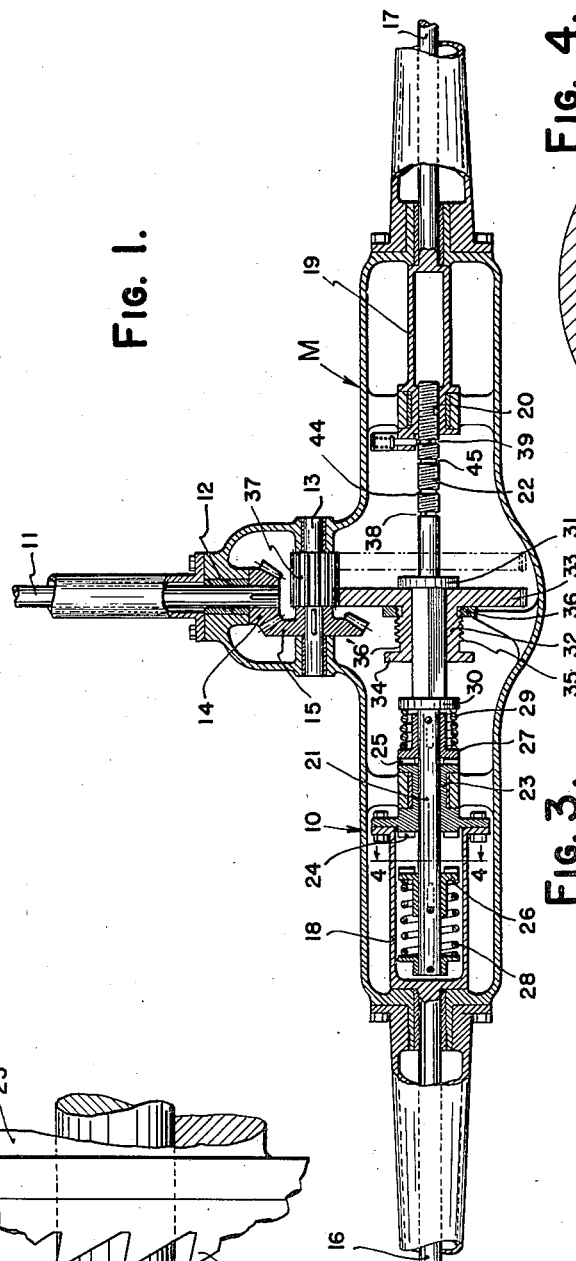
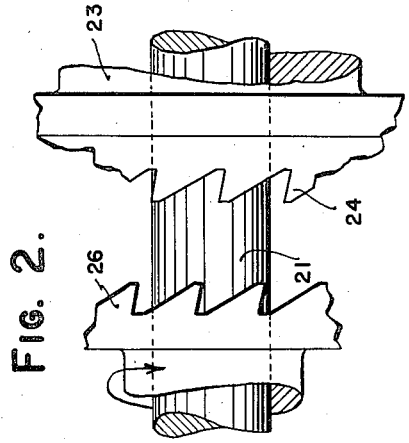
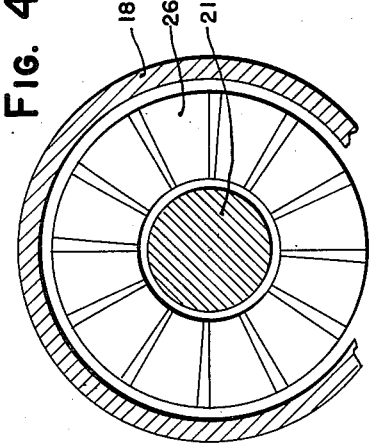
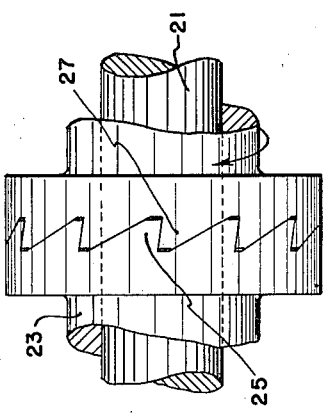
INVENTOR
RUFIN L. SZWEDA
BY
ATTORNEYS May 25, 1937.  R. L. SZWEDA  2,081,563
DIFFERENTIAL MECHANISM
Filed Sept. 12, 1936   2 Sheets-Sheet 2
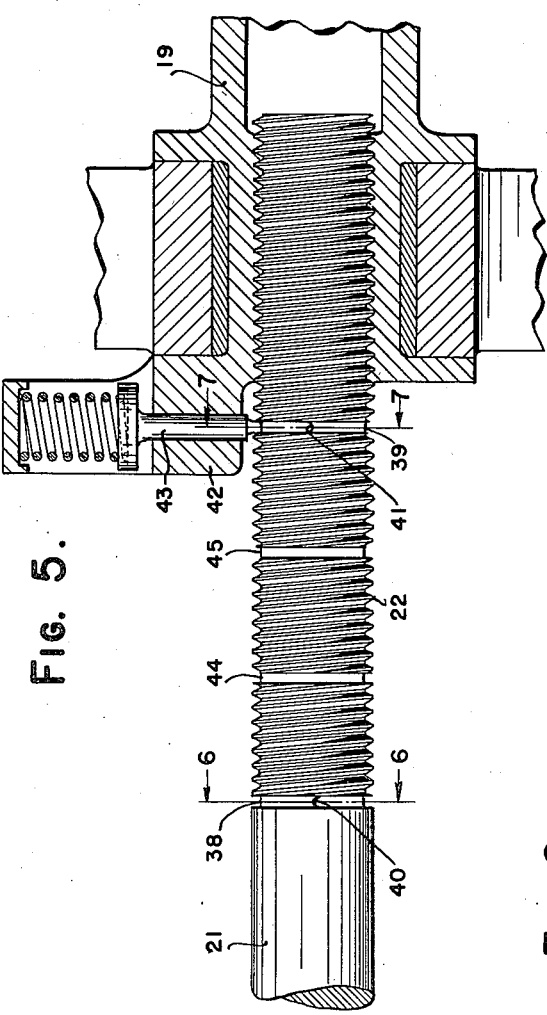
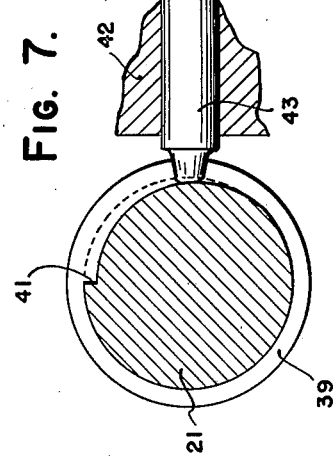
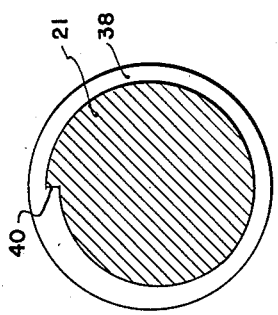
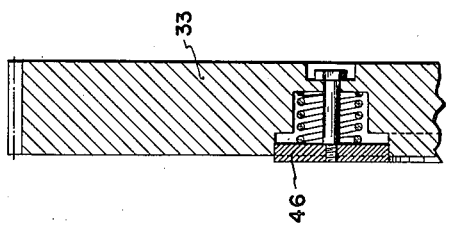
INVENTOR
RUFIN L. SZWEDA
BY
ATTORNEYS Patented May 25, 1937

2,081,563

UNITED STATES PATENT OFFICE 2,081,563

DIFFERENTIAL MECHANISM

Rufin L. Szweda, Milwaukee, Wis.

Application September 12, 1936, Serial No. 100,438

2 Claims. (Cl. 74—389.5)

This invention appertains to motor vehicles, and more particularly to a differential mechanism for the driving wheels thereof.

One of the primary objects of my invention is the provision of a novel differential mechanism for the drive wheels of a motor vehicle, whereby the usual complicated system of gears and pinions will be eliminated, and whereby a substantially direct drive will be had between the propeller shaft and the wheel stub shafts or axles.

Another salient object of my invention is to provide a novel drive mechanism between the propeller shaft and the stub axles in which the axles are permitted independent rotation from one another incident to the wheels turning around a curve, both during forward and backward movement of the vehicle, the construction being such that a positive drive will be had on the rear wheels, even if traction is had only on one wheel.

A further important object of my invention is to provide a differential drive mechanism for independent stub axles and an intermediate drive shaft carrying clutch sections having oppositely inclined tooth faces for engagement with the opposite clutch faces of a clutch section carried by one stub axle, with novel means for connecting the drive shaft with the other stub axle, and for feeding the clutch sections on the intermediate drive shaft into engagement with either one of the clutch faces carried by the first mentioned stub axle according to the direction of rotation of said intermediate drive shaft.

A still further object of my invention is the provision of novel means for taking care of the rotation of the stub axles, both on forward and reverse travel of the vehicle when said axles tend to rotate faster than the engine of the vehicle.

With these and other objects in view, the invention consists in the novel construction, arrangement, and formation of parts, as will be hereinafter more specifically described, claimed, and illustrated in the accompanying drawings, in which drawings:

Figure 1 is a fragmentary horizontal section through my novel differential drive mechanism.

Figure 2 is an enlarged, fragmentary detail view of the clutch utilized during the backing of the vehicle.

Figure 3 is an enlarged, fragmentary plan view illustrating the clutch utilized during the forward movement of the vehicle.

Figure 4 is an enlarged, detail transverse section taken on the line 4—4 of Figure 1, looking in the direction of the arrows.

Figure 5 is an enlarged, fragmentary sectional view illustrating the novel mechanism employed for shifting the intermediate drive shaft, and for connecting the intermediate drive shaft with one stub axle.

Figure 6 is a detail section on an enlarged scale through the intermediate drive shaft taken on the line 6—6 of Figure 5, looking in the direction of the arrows.

Figure 7 is a similar view taken on the line 7—7 of Figure 5, looking in the direction of the arrows.

Figure 8 is an enlarged, detail sectional view through the drive gear for the intermediate drive shaft.

Referring to the drawings in detail, wherein similar reference characters designate corresponding parts throughout the several views, the letter M generally indicates my improved differential mechanism, which comprises a stationary housing 10 of the desired form and shape. Extending into the housing 10 is the propeller shaft 11. Suitable bearings 12 are provided for the shaft 11, and these bearings can be of the roller or ball-bearing type, if preferred.

Rotatably mounted within the housing 10 is a transversely extending counter-shaft 13 operatively connected to the propeller shaft in any preferred manner, such as through the use of beveled gears 14 and 15. Extending into the opposite ends of the housing are rotatable stub axles 16 and 17. Any preferred type of bearings can be provided for supporting the stub axles, and the outer ends of these axles carry the usual ground wheels (not shown). The inner ends of the stub axles 16 and 17 are provided with elongated sleeves 18 and 19, for a purpose which will be later set forth, but it is to be noted at this time that the sleeve 18 is of a greater size than the sleeve 19, and that the sleeve 19 terminates in a nut 20.

Between the stub axles 16 and 17 is an intermediate drive shaft 21. One end of the drive shaft extends into the sleeve 18, and the other end of the drive shaft is threaded, as at 22, and a part of said threaded portion is fitted into the nut 20.

Securely bolted or otherwise connected to the inner end of the sleeve 18 is a clutch section 23 having clutch faces 24 and 25 on its opposite sides. The teeth of these faces are inclined in opposite directions. Secured to the intermediate drive shaft 21, on opposite sides of the clutch section 23, are clutch sections 26 and 27, which are adapted to engage the clutch sections 24 and 25 at certain times. The clutch section 27 is adapted to engage the clutch face 25 during the forward driving movement of the vehicle, and the clutch section 26 is adapted to engage the clutch face 24 during retrograde movement of the vehicle.

The clutch section 26 has a limited sliding movement on the shaft 21, and an expansion coil spring 28 is employed for normally urging the clutch section 26 in the direction of the clutch face 24. The clutch section 27 also has limited sliding movement on the shaft 21 and is normally urged toward the clutch face 25 by an expansion coil spring 29. It is to be noted that the spring 29 bears against a stop collar 30, which forms an important part of the present invention.

Arranged in spaced relation to the stop collar 30 is a second stop collar 31, and the portion of the shaft 21 between the stop collars 31 and 31 is of a polygonal shape for slidably receiving the hub 32 of a drive gear 33. The drive gear 33 is formed on one end of the hub, and a stop flange 34 is formed on the other end of the hub. The hub is threaded, as at 35, between the gear and the stop flange, and these threads are adapted to be engaged by a stationary nut or an internally threaded ring 36 carried by the differential housing. The threads 35 are interrupted adjacent to the gear 33, so that the hub can run free in the nut when the hub and gear are in one of their positions.

The gear 33 meshes with an elongated pinion 37 on the counter-shaft 13, and due to the shape of the pinion driving connection is permitted between the pinion and the gear during the sliding movement of the gear 33, as will be later set forth.

The threaded portion 22 of the shaft 21 has formed therein at spaced points annular grooves 38 and 39. Each of these grooves has formed therein stop shoulders 40 and 41. The stop shoulder 40 is oppositely disposed relative to the stop shoulder 41. The sleeve 19 of the stub axle 17 carries a bracket 42, in which is slidably mounted a spring pressed latch pin 43. The latch pin 43 is adapted to ride in the groove 39, and to engage the shoulder 41, so as to bring about a drive between the shaft 21 and the stub axle 17 during forward movement of the vehicle. The pin 43 is adapted to ride in the groove 38, and to engage the stop shoulder 40 to bring about a drive between the shaft 21 and the stub axle 17 during retrograde movement of the vehicle.

From the description so far it can be seen that during forward movement of the vehicle, the propeller shaft 11 will be turning in a clockwise direction (referring to Figure 1), which will rotate the counter-shaft 13 in the opposite direction and bring about the driving of the intermediate drive shaft 21 through the gear 33 and pinion 37.

Considering that the clutch section 27 is in engagement with the clutch face 25 and the pin 43 is in the groove 39, a direct drive will be had between the intermediate drive shaft 21 and the axles 16 and 17. In going around a curve, should the axle 17 turn faster than the axle 16, then the pin 43, turning faster than the intermediate shaft 21, will continuously ride over the inclined face of the shoulder 41, allowing the desired differential movement. Should the axle 16 rotate faster than the axle 17 going around a curve, then the clutch face 25 will simply ratchet over the clutch section 27, allowing the desired differential movement.

Now, should it be desired to back the vehicle, the shaft 21 will be driven in a reverse direction. The pin 43 will engage in the threads 22 of the shaft, and the shaft will be fed to the right until the pin rides into the groove 38. This movement of the shaft will carry the clutch section 27 away from the clutch face 25, and will carry the clutch section 26 into engagement with the clutch section 24.

In turning a curve, should the axle 17 rotate faster than the axle 16 and the shaft 21, then the pin 43 will ride over the inclined face of the shoulder 40, allowing the desired differential movement. If the axle 16 rotates faster than the axle 17 and the shaft 21, then the clutch section 26 will simply ratchet over the clutch face 24. When the vehicle is again started forward, then the shaft 21 will again be rotated in a clockwise direction, and the pin 43 will engage the threads at the right of the groove 38, and the shaft 21 will be shifted until the pin 43 rides into the groove 39 and the clutch section 27 engages the clutch face 25.

Between the grooves 38 and 39 is a pair of spaced annular grooves 44 and 45.

If the vehicle is going forward and both of the wheels tend to rotate faster than the engine, then the threads on the nut 36 will catch the threads 35 on the hub 32, and the gear 33 will be fed to the right until the nut rides into the groove 36' formed in the hub adjacent to the flange 34. Further movement of the hub is prevented by the engagement of the flange 34 with the nut.

During the sliding movement of the hub, the shaft 21 will be shifted to the right. Consequently, the pin 43 will ride on the threads 22 of the shaft 21 until the pin reaches the groove 45, where the pin is permitted to turn freely. The pin will reach the groove 45 when the flange 34 engages the nut.

When direct drive from the engine is resumed, then the threads on the nut 36 will catch the threads 35, and the gear will be moved to the left until the pin 43 again reaches the groove 39.

If the vehicle is being backed and the axles 16 and 17 tend to run faster than the shaft 21, the same movement will take place, and the pin 43 will ride from the groove 38 into the groove 44. During this action the clutch section will be in engagement with its clutch face, due to the limited movement allowed each clutch section on the drive shaft 21.

If desired, the gear 33 and the flange 34 can carry spring pressed push and wear plates 46, as shown in Figure 8 of the drawings. These plates will give the desired impulse to the hub to insure the catching of the threads on the hub with the threads on the nut or ring 36.

Changes in details may be made, but what I claim as new is:

1. In a differential mechanism, a propeller shaft, a pair of independent stub axles, an intermediate drive shaft, means operatively connecting the propeller shaft with the drive shaft, a clutch section connected with one stub axle having clutch faces on its opposite ends provided with oppositely inclined teeth, spaced clutch sections on the intermediate drive shaft for engagement at different times with the clutch faces, said intermediate drive shaft having a threaded portion provided with spaced grooves having oppositely directed stop shoulders therein, and a spring pressed pin carried by the other stub axle for engagement in said grooves at different times and for engaging the thread at another time to shift said drive shaft.

2. In a differential mechanism, a propeller shaft, a pair of independent stub axles, an intermediate drive shaft having a polygonal portion intermediate its ends, a drive gear on said polygonal portion for longitudinal movement, a counter-shaft, means operatively connecting the counter-shaft with the propeller shaft, an elongated pinion on the counter-shaft meshing with the gear on the intermediate drive shaft, said gear having a threaded hub provided with annular grooves at each end thereof, and stops beyond the grooves, a stationary nut adapted to normally ride in either one of the grooves and for engagement with the threads to shift the gear at a predetermined time, a clutch section carried by one stub axle having clutch faces at its opposite ends provided with oppositely directed inclined teeth, spaced clutch sections on the drive shaft for engagement with the clutch faces at different times, said last mentioned clutch sections having limited sliding movement on the drive shaft, the drive shaft adjacent to the other stub axle being provided with spaced grooves having oppositely directed shoulders, a spring pressed pin carried by the last mentioned stub axle for engagement in said grooves at different times and for engagement with the thread on said drive shaft at another time to shift said drive shaft, and said drive shaft having spaced annular grooves intermediate the first mentioned grooves to receive said pin upon the shifting of the drive gear.

RUFIN L. SZWEDA.